ELECTRONICALLY MULTIPLEXED DYNAMIC SERIAL STORAGE REGISTER

Filed Sept. 7, 1965

INVENTORS
Edward R. Higgins &
John L. Patrick.
BY E. F. Possessky
ATTORNEY

United States Patent Office
3,414,889
Patented Dec. 3, 1968

3,414,889

ELECTRONICALLY MULTIPLEXED DYNAMIC SERIAL STORAGE REGISTER

Edward R. Higgins, North Linthicum, and John L. Patrick, Laurel, Md., assignors to Westinghouse Electric Corporation, Pittsburgh, Pa., a corporation of Pennsylvania Filed Sept. 7, 1965, Ser. No. 485,293
2 Claims. (Cl. 340—173)

ABSTRACT OF THE DISCLOSURE

A multiphase clock controls the entry of binary data from separate input data channels into a delay line during an interation period of preselected duration. The data is stored as separate words having respective sets of bits registered during the respective clock phases. Data read from the line is reentered in the line in combination with new word data from the input data channels.

BACKGROUND OF THE INVENTION

The present invention relates to dynamic serial digital data storage registers and more particularly to register circuits which provide improved multiplexed data registration.

Data processing applications generally require the use of storage or memory units. For reasons of economy and reliability, dynamic serial storage registers are often employed as memory units, particularly in applications where processed data is used for process or product control purposes. In a dynamic serial storage register, digital data is time series registered and thereafter recirculated under continuous control until it is desired to clear the register. Magnetostrictive and glass delay lines are presently the most common forms of dynamic serial storage registers.

CROSS REFERENCE TO RELATED APPLICATIONS

As an illustration of delay line usage, reference is made to a copending application entitled "Multiphase Clock Control System for Machine Tools," Ser. No. 485,373, filed by J. Patrick on Sept. 7, 1965, and assigned to the present assignee, where a delay line register is employed to store command and feedback position data during the digitally controlled operation of a machine tool.

SUMMARY OF THE INVENTION

It is desirable that the theoretical storage capacity of dynamic serial storage registers be used as efficiently as possible, particularly where separate sets of data are to be separately registered in a data processing system. In accordance with the principles of the present invention, multiphase clock and logic circuitry is arranged and operated to produce electronically multiplexed registration of data in a dynamic serial storage register. The data is recirculated under interative clock control and it is combined with new input data during register reentry. Further, if it is desired to compare different sets of data in the separate register phases, corresponding bits of the different data sets can be registered in successive phase bit times and comparison is made by time shifting one set of data as it is read from the storage register.

It is therefore an object of the invention to provide a novel dynamic serial storage register circuit in which data can be registered with improved efficiency.

Another object of the invention is to provide a novel dynamic serial storage register circuit in which different sets of data are registered in different phase times under electronic multiphase clock control and in which new input data is combined with stored data as the latter is recirculated under iteration control.

An additional object of the invention is to provide a novel dynamic serial storage register circuit in which multiplex registered sets of data are efficiently read from registration for convenient interset data comparison or other use.

These and other objects of the invention will become more apparent upon consideration of the following detailed description along with the attached drawings.

Figure 1:
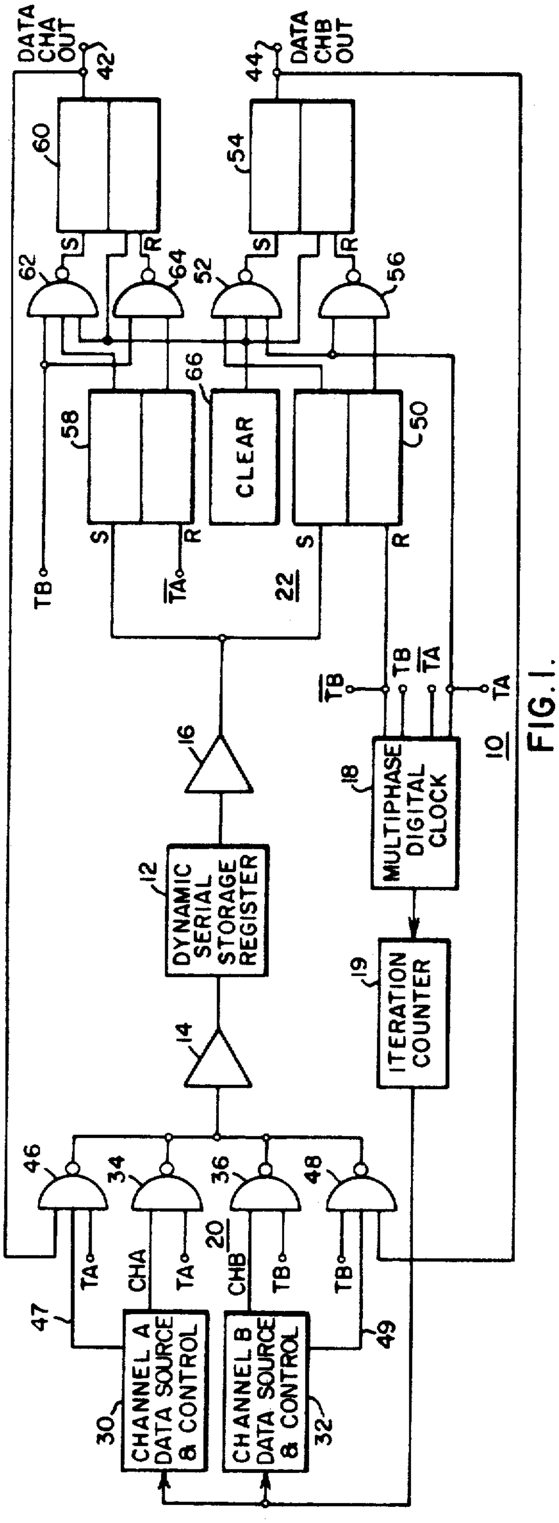
FIG. 1 shows a schematic diagram of a dynamic serial storage register circuit arranged in accordance with the principles of the invention.

More specifically, there is shown in FIG. 1 a dynamic serial digital data storage register circuit 10 including a dynamic serial storage register 12 for which a write amplifier 14 of suitable design and a read amplifier 16 of suitable design are provided. The amplifiers 14 and 16 can be transistor or other solid state amplifiers.

Figure 2:
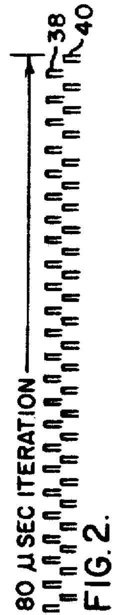
FIG. 2 shows the outputs of a multiphase digital clock employed in the circuit of FIG. 1.

A multiphase digital clock 18 and a clock iteration counter 19 control the operation of the circuit 10. In this case, the clock 18 has a two phase output comprising alternately successive clock pulses TA and TB as shown in FIG. 2. The pulse complements $\overline{TA}$ and $\overline{TB}$ are also provided for resetting certain flip-flops. An example of a suitable circuit for the digital clock 18 is shown and described in the aforementioned copending application.

Input logic gating circuitry 20 is connected to the write amplifier 14 for data registration in the register 12, and output logic circuitry 22 is connected to the read amplifier 16 so as to store the registered data for output access and for readmission to the register 12 through the input logic circuitry 20 synchronously with the iteration rate. The logic elements, including flip-flops, in the circuits 20 and 22 are in this case NAND type and can be separate component circuits or microcircuits or integrated logic block circuits.

Figure 3:
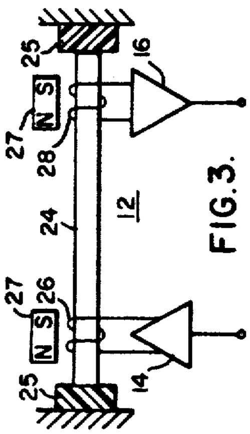
FIG. 3 shows a schematic diagram of a dynamic serial storage register in the form of a magnetostrictive sonic delay line.

As shown in FIG. 3, the dynamic serial storage register 12 can be provided in the form of magnetostrictive delay line comprising a straight rod 24, or a coiled rod (not shown), which is formed from a nickel alloy or other suitable material. Generally, the delay line rod 24 is end supported in its package by absorptive material as indicated by the reference character 25 substantially to prevent acoustic end reflections. A write coil 26 and a read coil 28 are provided at opposite ends of the rod 24 in cooperation with respective magnets 27. The write and read amplifiers 14 and 16 are connected respectively to the coils 26 and 28.

Each time the write amplifier output changes, magnetostrictive action on the rod 24 produces a sonic vibration which travels down the rod 24 to the read coil 28 where the reluctance of the magnetic path for the magnet 27 is changed and the acoustic energy is transformed to electric energy for amplification by the read amplifier 16. The magnetostrictive delay line register in the present case is operated in the return-to-zero mode for which the upper operating frequency limit is usually about 1 megacycle. Alternately, the magnetostrictive delay line register can be operated in the non-return-to-zero mode in which case the upper operating frequency limit is usually about 2 megacycles.

If the dynamic serial storage register 12 is provided in the form of a glass delay line (not shown), the write and read elements are provided in the form of piezoelectric transducers rather than in the form of electromagnetic coils as shown for the magnetostrictive delay line in FIG. 3. In the return-to-zero mode of operation, the upper operating frequency limit for a glass delay line characteristically is about 10 megacycles. When operated in the non-return-to-zero mode, the glass delay line characteristically has an upper frequency limit of about 30 to 40 megacycles.

Since the digital clock 18 in this case produces a two phase output, a pair of data sources 30 and 32 are connected to the write amplifier 14 through respective NAND gates 34 and 36. Channel A data, preferably in non-return-to-zero form, is clocked into the register 12 in time series during TA clock pulses and channel B data, also preferably in non-return-to-zero form, is clocked into the register 12 in time series during TB clock pulses.

The data source 30 is controlled by the iteration counter 19 so that the first channel A data bit is clocked into the register 12 during the first TA pulse of a clock iteration as indicated by the reference character 38 in FIG. 2. Similarly, the data source 32 is controlled by the counter 19 so that the first channel B data bit is clocked into the register 12 during the first TB pulse of a clock iteration as indicated by the reference character 40 in FIG. 2. Each clock iteration in this case is 80 microseconds long and includes 80 TA and TB clock pulses which occur alternately every microsecond. As indicated in the aforementioned copending application, data can be written in the register 12 during successive clock iterations so as to permit updating as new input data bits occur with successive iterations or so as to permit binary arithmetic processes to be performed on the input data during successive iterations. In the same application, iteration control of data admission is explained in greater detail.

During each iteration, a single word time of 80 microseconds can be provided for each data channel. Phase A word time then spans eighty TA clock pulses and phase B word time spans eighty TB clock pulses. If desired, a plurality of word times can be provided in each iteration phase time. For example, X and Y word times can span successive sets of forty TA clock pulses in each iteration and X and Y word times can span successive sets of forty TB clock bits in each iteration.

In the present embodiment, total registration time length is 80 microseconds in correspondence with the iteration time period, and about 78.5 microseconds of the total is provided by the delay line time length. The balance is provided by the output logic circuitry 22 which stores the time series delay line output bits in the respective data channels for about 1.5 microseconds for access at output terminals 42 and 44 and for iterative recirculation in the register 12 through recirculation NAND gates 46 and 48 which are suitably gated as indicated by the reference characters 47 and 49 during recirculation time. Readmission of each recirculated data bit is made in the register 12 exactly one iteration time period after its previous entry in the register 12. The propagation time of the register 12 can vary with temperature and other ambient conditions and the clock pulse generation rate can also vary, but normal propagation time and clock frequency variations have no effect on performance of the circuit 10.

In the output logic circuitry 22, each phase B1 bit is negated to set a NAND temporary storage flip-flop 50 when it is read from the register 12 by the read amplifier 16 about 78.5 microseconds after its initial registration. Further, the storage flip-flop 50 is set shortly after a TB clock pulse has been generated at a point in time equal to 78 microseconds after the initial registration of the phase B bit in the register 12. On the next TA clock pulse, i.e. when time equals 79 microseconds, a NAND gate 52 is operated to set a temporary memory or synchronizer NAND flip-flop 54. The data bit is then stored until the next TB clock pulse at the 80 microsecond time point when the data bit is re-entered in the register 12 through the recirculation gate 48 exactly one 80 microsecond iteration time period after its previous registration. The synchronization flip-flop 54 is reset through NAND gate 56 by the TA clock pulse at the 81 microsecond time point and following reset of the storage flip-flop 50 by $\overline{TB}$ during the TB clock pulse at the 80 microsecond time point. Thus, when a phase B1 bit results in setting the flip-flops 50 and 54, the flip-flops 50 and 54 are respectively reset within about 1.5 microseconds for processing the next phase B data bit.

Similarly, storage and synchronization flip-flops 58 and 60 cooperate with the read amplifier 16 and NAND gates 62 and 64 to make each phase A data bit available at the recirculation gate 46 exactly one iteration time period after its previous entry in the register 12. However, $\overline{TA}$ clock pulses are used to operate the gates 62 and 64.

A clear device 66 is provided for clearing the register circuit 10 when desired. In this instance, the clear device 66 is connected to the set gates 52 and 62 and the reset terminal of the flip-flops 60 and 54. To clear the register circuit 10, the clear device 66 generates a logic 0 value thereby resetting the flip-flops 54 and 60. Data recirculation in both channels is thus prevented.

As the time series data bits are successively stored in the synchronization flip-flops 54 and 60, they are made available for external use at the output terminals 42 and 44. If the data bits in each data channel are in pure binary word form and if it is desired to compare the binary words for error detection or the like, convenient comparison can be made when corresponding bits of the two words occur during successive and alternate phase clock pulse times.

Other types of logic can be employed in forming the circuit 10 if desired. For example, AND-OR logic can be employed. In that case, all of the NAND gates are replaced by AND gates and all of the NAND type flip-flops are replaced by AND type flip-flops. In addition, an OR gate is connected between the write amplifier 14 and the substituted AND gates in the input logic circuitry 20. The connections from the clear device 66 are also suitably modified to provide for register clearance.

The multiphase digital clock 18 can be provided with more than two phase outputs, and in that event additional logic components are employed in the input and output logic circuitry 20 and 22. For each additional clock phase, an additional data channel can be provided by an additional pair of input gates connected in the input logic circuitry 20 and operated during clock pulses of the additional phase. Similarly, the output logic circuitry 22 can be provided with additional flip-flops and set-reset gates to process the data bits in the additional channel for output access and for iterative recirculation.

In summary, the storage capacity of a dynamic serial storage register is efficiently utilized in a storage register circuit through electronically multiplexed registration of a plurality of channels of data. A multiphase clock controls the operation of input and output logic circuitry connected to the dynamic serial storage register in producing the improved register performance.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A dynamic serial storage register circuit comprising a dynamic serial storage register, a multiphase clock generating a plurality of pulse outputs in separate phases, means responsive to said clock for indicating successive iterations each spanning a predetermined number of clock pulses, logic circuit means coupled to said register and operative to process a plurality of time series data inputs, the phase outputs of said multiphase clock and an output of said iteration indicating means coupled to said logic circuit means so as to register in a clock iteration the respective sets of serial data in response to clock pulses of different clock phases, means responsive to said multiphase clock for reading data from said register, and means responsive to said reading means and said iteration indicating means for applying and processing the read data through said logic circuit means in combination with new data from the time series data inputs.

2. A dynamic serial storage register circuit comprising a dynamic serial storage register, at least two input gates for respective sets of time series input data, means coupling said input gates to said register, a multiphase clock iteratively generating at least two pulse outputs in separate phases, means connecting one of the clock phase outputs to one of the input gates and another of the clock phase outputs to another of the input gates so as to register in a clock iteration the sets of serial data respectively during clock pulses of the respectively associated clock phases, means responsive to said clock for reading and iteratively recirculating data in said register, said register having a propagation time less than the iteration time period and asynchronous with the clock pulse generation rate, said reading and recirculating means including at least two sets of memory and synchronization flip-flops, set and reset gates interconnecting each set of said flip-flops, means coupling said memory flip-flops to the output of said register, means coupling said synchronization flip-flops respectively to said one and said other input gates, said one clock phase output connected to the memory flip-flop which is coupled to said one input gate, said other clock phase output connected to the memory flip-flop which is coupled to said other input gate, said one clock phase output connected to the set and reset gates which are coupled to said other input gate, and said other clock phase output connected to the set and reset gates which are coupled to said one input gate.

References Cited

UNITED STATES PATENTS

| | | | |
|---|---|---|---|
| 3,100,294 | 8/1963 | Dryden | 179—15 |
| 3,309,671 | 3/1967 | Lekven | 340—172.5 |
| 3,334,188 | 8/1967 | Soos | 179—15 |

BERNARD KONICK, *Primary Examiner.*

J. F. BREIMAYER, *Assistant Examiner.*